United States Patent
Bullukian et al.

(10) Patent No.: US 9,395,979 B1
(45) Date of Patent: Jul. 19, 2016

(54) PRE-EMPTIVE DEVELOPMENT CONFLICT RESOLUTION

(71) Applicant: Sprint Communications Company L.P., Overland Park, KS (US)

(72) Inventors: Dana Bullukian, Ocoee, FL (US); Anthony D. Chen, Orlando, FL (US); Kevin V. Jadunandan, Palm Bay, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 149 days.

(21) Appl. No.: 13/723,193

(22) Filed: Dec. 20, 2012

(51) Int. Cl.
*G06F 9/44* (2006.01)

(52) U.S. Cl.
CPC .......................................... *G06F 8/71* (2013.01)

(58) Field of Classification Search
None
See application file for complete search history.

(56) References Cited

U.S. PATENT DOCUMENTS

| | | | |
|---|---|---|---|
| 5,278,979 A * | 1/1994 | Foster et al. | |
| 5,893,119 A | 4/1999 | Squibb | |
| 5,983,277 A * | 11/1999 | Heile | G01R 31/3177 709/215 |
| 6,223,343 B1 | 4/2001 | Hopwood et al. | |
| 6,393,437 B1 | 5/2002 | Zinda et al. | |
| 6,601,233 B1 | 7/2003 | Underwood | |
| 6,708,265 B1 * | 3/2004 | Black | 711/207 |
| 6,757,893 B1 * | 6/2004 | Haikin | 717/170 |
| 6,917,950 B2 | 7/2005 | Mcbride et al. | |
| 6,934,931 B2 | 8/2005 | Plumer et al. | |
| 7,251,669 B1 | 7/2007 | Arora | |
| 7,277,901 B2 | 10/2007 | Parker et al. | |
| 7,296,053 B2 | 11/2007 | Abdulhayoglu | |
| 7,503,034 B2 | 3/2009 | Berg et al. | |
| 7,512,932 B2 | 3/2009 | Davidov et al. | |
| 7,526,759 B2 | 4/2009 | Sanjar et al. | |
| 7,539,976 B1 | 5/2009 | Ousterhout et al. | |
| 7,565,647 B2 | 7/2009 | Davidov et al. | |
| 7,676,788 B1 | 3/2010 | Ousterhout et al. | |
| 7,797,678 B2 | 9/2010 | Moulckers et al. | |
| 7,870,535 B2 | 1/2011 | Rippert, Jr. et al. | |
| 8,069,433 B2 | 11/2011 | Parsell et al. | |
| 8,245,192 B1 * | 8/2012 | Chen et al. | 717/122 |
| 2002/0026630 A1 | 2/2002 | Schmidt et al. | |
| 2004/0083355 A1 * | 4/2004 | Smith et al. | 713/1 |

(Continued)

OTHER PUBLICATIONS

Fitzpatrick et al. "CVS integration with notification and chat: lightweight software team collaboration."Proceedings of the 2006 20th anniversary conference on Computer supported cooperative work. ACM, 2006.*

(Continued)

*Primary Examiner* — Chameli Das
*Assistant Examiner* — Joanne Macasiano

(57) ABSTRACT

A method is provided for managing software. The method comprises: when a first version of a software development file in a first software development zone is modified, placing a record of the file in a log of modified files; when an attempt is made to open a second version of the file in a second software development zone, comparing an identity of the second version of the file to the log of modified files; and when a match is detected between the identity of the second version of the file and a record of a file in the log of modified files, providing to a computer terminal associated with the second software development zone a notification that indicates that a modification has been made to a version of the file and further indicates an identity of a software developer associated with the first software development zone.

17 Claims, 5 Drawing Sheets

(56) References Cited

U.S. PATENT DOCUMENTS

| | | |
|---|---|---|
| 2005/0022156 A1 | 1/2005 | Schwan et al. |
| 2005/0044531 A1 | 2/2005 | Chawla et al. |
| 2009/0300580 A1 | 12/2009 | Heyhoe et al. |
| 2014/0059528 A1* | 2/2014 | Gagliardi .................. 717/170 |

OTHER PUBLICATIONS

Bruegge et al. "Sysiphus: Enabling informal collaboration in global software development." Global Software Engineering, 2006. ICGSE'06. International Conference on. IEEE, 2006.*

Abeysinghe, "PHP Team Development", Packet Publishing Packet, 2009; [retrieved on Mar. 30, 2012]; Retrieved from the Internet <URL:http://www.bnn.go.id/portal/.../lelang-pekerjan-dokumens.pdf>; pp. 1-169.

Luo, et al., "Ariadne: An Eclipse-based System for Tracking the Originality of Source Code", IBM Systems Journal, 2007; [retrieved on Mar. 30, 2012]; Retrieved from the Internet <URL:http://ieeexplore.ieee.org/stamp/stamp.jsp?tp=&arnumber=5386615; pp. 289-303.

McIntosh, "Studying the Evolution of Build Systems", Quen's University, School of Computing, 2011; [retrieved on Mar. 30, 2012]; Retrieved from the Internet <URL:http://sail.cs.queensu.ca/publications/pubs/masterthesis2011_mcintosh.pdf>; pp. 1-102.

Nagel, "SubversionVersion Control", 2005 Prentice Hall; [retrieved on Jan. 20, 2012]; Retrieved from the Internet <URL: http://ptgmedia.pearsoncmg.com/images/0131855182/downloads/Nagel book.pdf>; pp. 1-343.

FAIPP Pre-Interview Communication dated Feb. 13, 2012, U.S. Appl. No. 12/273, 535, filed Nov. 18, 2008.

Notice of Allowance dated Apr. 4, 2012, U.S. Appl. No. 12/273,535, filed Nov. 18, 2008.

* cited by examiner

PRE-EMPTIVE DEVELOPMENT CONFLICT RESOLUTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large software development projects involve complex processes. Software developers and development teams may find it difficult to work on the same portion of code simultaneously. Providing a full and current copy of a software project to a developer's work environment may be time consuming and complicated as enterprise software projects are often large and constantly changing. A developer may find it difficult to remain current on recent changes to the project made by other developers or teams. Submitting, testing, and committing changes in a large development environment also presents challenges as a developer may not always know what changes other developers are making and submitting to a test environment. A developer may submit updated code to a test or staging server only to discover that changes the developer made are obviated or superseded by changes to related or dependent code submitted by other developers in the interim period. Resolution of conflicts arising from two or more developers changing the same code simultaneously adversely affects developer productivity. Testing of software changes in a large project may take an extended period and produce unexpected or unreliable results.

SUMMARY

In an embodiment, a method for managing software is provided. The method comprises: when a first version of a software development file in a first software development zone is modified, placing a record of the software development file in a log of modified files; when an attempt is made to open a second version of the software development file in a second software development zone, comparing an identity of the second version of the software development file to the log of modified files; and when a match is detected between the identity of the second version of the software development file and a record of a file in the log of modified files, providing a notification to a computer terminal associated with the second software development zone, wherein the notification indicates that a modification has been made to a version of the software development file other than the second version of the software development file and further indicates an identity of a software developer associated with the first software development zone.

In another embodiment, a system for managing software is provided. The system comprises a memory, a processor, a log component stored in the memory and executed by the processor, and a monitor component stored in the memory and executed by the processor. The execution of the monitor component occurs such that, when a first version of a software development file in a first software development zone is modified, the monitor component places a record of the software development file in the log component, further occurs such that, when an attempt is made to open a second version of the software development file in a second software development zone, the monitor component compares an identity of the second version of the software development file to records in the log component, and further occurs such that, when a match is detected between the identity of the second version of the software development file and a record in the log component, the monitor component provides a notification to a computer terminal associated with the second software development zone, wherein the notification indicates that a modification has been made to a version of the software development file other than the second version of the software development file and further indicates an identity of a software developer associated with the first software development zone.

In another embodiment, a method for rolling a software development system back to a previous version of the system is provided. The method comprises creating a plurality of copies of all files in the software development system, each of the plurality of copies being created whenever a change to any one of the files is committed. The method further comprises, when a system rollback to a previous version of the system is to occur, performing the system rollback to one of the copies of the files.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

U.S. Pat. No. 8,245,192, issued Aug. 14, 2012, entitled "Independent Software Development Zones", which is incorporated herein by reference as if reproduced in its entirety, describes a system for independent software development zones. Embodiments of the present disclosure provide enhancements to the system disclosed in that patent application. Details regarding that system are provided in U.S. Pat. No. 8,245,192, but a brief overview of that system may be useful here in describing the present embodiments.

Figure 1:
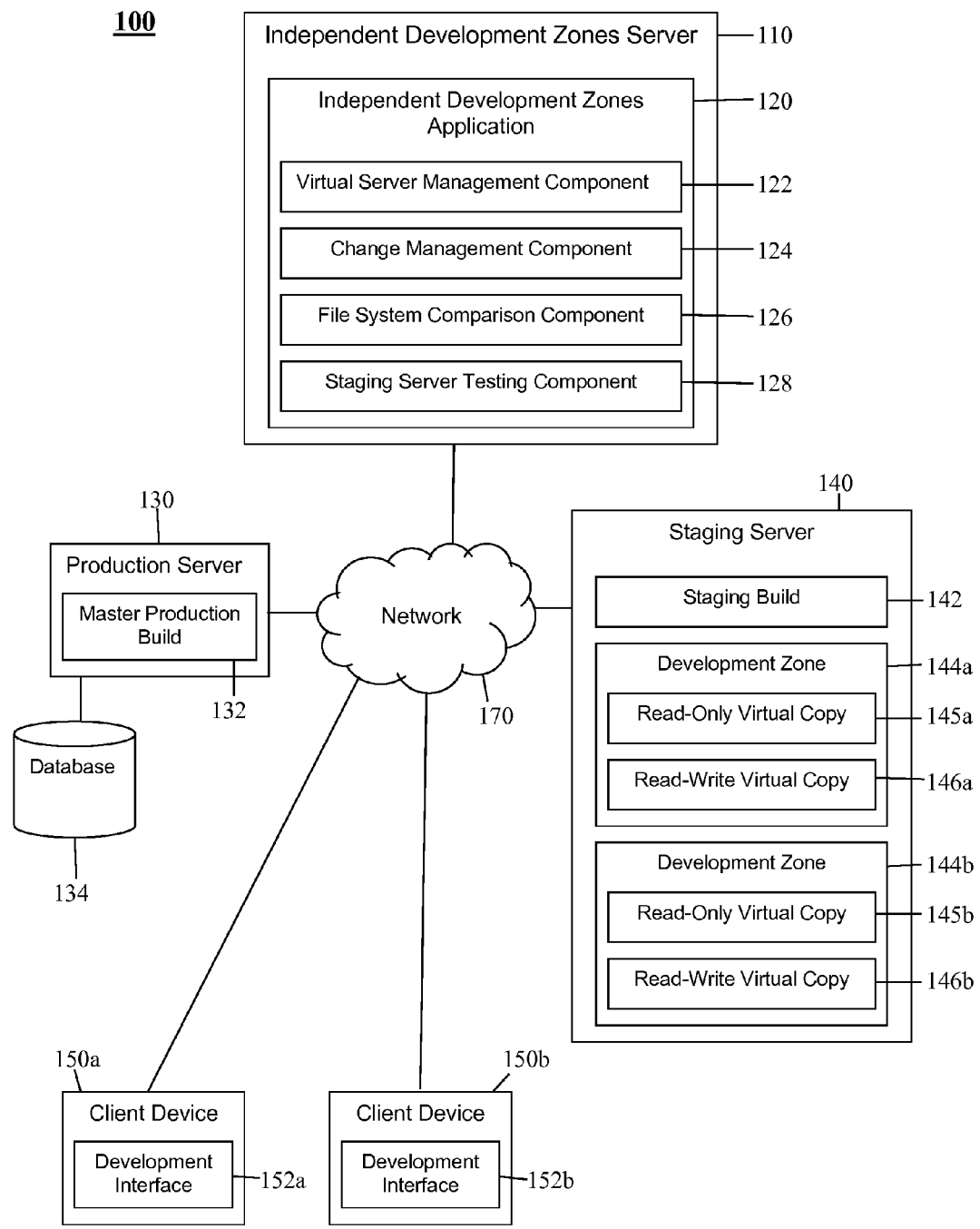
FIG. 1 is a block diagram of a system according to an embodiment of the disclosure.

FIG. 1 illustrates an embodiment of a system 100 disclosed in U.S. Pat. No. 8,245,192. The system 100 permits a software developer to request and rapidly receive a virtual copy of a master production build 132 accessible exclusively by the developer, to make code changes in the virtual copy, and to commit changes made to the virtual copy to the master production build 132. The system 100 allows current virtual copies of the master production build 132 to be produced upon developer request by generating a snapshot or replica of the master production build 132. The snapshot or replica is a complete record taken at a moment in time of the status of files in the master production build 132. These files may comprise computer instruction files, for example files written in a computer programming language or files written in scripting language. These files may comprise computer configuration files. These files may comprise data. These files may comprise content that may be presented during execution. These files may comprise yet other information. Changes to the developer's virtual copy comprise state-based references to the master production build 132. The system 100 tracks changes made to individual files by the developer in the virtual copy created for the developer. When the developer makes changes to a file, the system 100 notes the identity of the specific file changed and the changes made to the file. The copy of the master production build 132 receiving code changes is virtual because it is not truly a copy, but rather is a record of changes only to individual files made by the developer. When the developer commits code changes, a staging server 140 receives the files that received changes by the developer since the virtual copy was generated. The economy of action in this process permits efficiency and speed in providing the developer with the requested virtual copy when it is created and in testing and committing the developer's code changes when the developer completes that phase of work.

A development zone 144 is created when a developer requests a current virtual copy of the master production build 132 to write new software code to be added to the master production build 132 or to change or delete previously existing software code in the master production build 132. Only the developer given permission to make changes in a development zone 144 may do so. Two or more development zones 144 may exist concurrently. Development zones 144 operate independently of each other. Development zones 144 are isolated from the master production build 132, and a developer's code changes are not committed to the master production build 132 until the developer's changes are tested in the developer's development zone 144. After testing, the developer may then commit the changes to a staging build 142 located on the staging server 140. The staging build 142 is substantially identical to the master production build 132.

The system 100 creates a read-only virtual copy 145 and a read-write virtual copy 146 of the master production build 132 in the development zone 144 created for the developer. In some contexts, the read-write virtual copy 146 may be referred to as a read-write clone of the master production build 132. As is known to those of skill in the art, cloning may refer to making a copy of something, such as a copy of a server file system as a first step for building a new server, such as a copy of the contents of a disk drive for use in restoring or rebuilding the disk drive in the event of a catastrophic failure of the disk drive, and for other copying purposes. The read-write virtual copy 146 is used for the developer to make code changes. The read-only virtual copy 145 is used to keep a record of the master production build's exact status at the time the development zone 144 was created. When a developer completes a phase of code development and wishes to commit the newly developed code to the master production build 132, the read-only virtual copy 145 is compared to the current master production build 132 to determine changes committed to the master production build 132 subsequent to the creation of the developer's zone 144. This comparison determines changes committed to the master production build 132 by developers other than the subject developer since the subject developer's zone 144 was created. Changes found to have been committed by other developers since creation of the subject developer's zone 144 are furnished to the subject developer's development zone 144, and those changes are combined with the developer's read-write virtual copy 146. The subject developer then has a fully current replica of the master production build 132 combined with the subject developer's own changes. If the subject developer and other developers have made changes to one or more of the same individual files during the time the subject developer's development zone 144 has been in effect, the subject developer will be prompted to examine and resolve those individual file conflicts before the system 100 will accept, test, and eventually commit the subject developer's current changes into the master production build 132.

In addition to the master production build 132 that is the master version of the software project, the system 100 also comprises the staging build 142 running on the staging server 140 that is a working copy of the master production build 132. Changes committed by development zones 144 are first copied to the staging build 142. The staging build 142 receives changes submitted by only one development zone 144 at a time so as to not mix code changes submitted by different development zones 144. While the system 100 is comparing files submitted by a development zone 144 to determine changes and the staging build 142 is processing submitted changes, the system 100 is in effect locked and temporarily does not permit other development zones 144 to submit changes nor does it permit new development zones 144 to be created. Once the process of reviewing and processing submitted changes on the staging build 142 is complete and the submitted code is determined to be acceptable, the changes are committed to the staging build 142. At that moment the staging build 142 and the master production build 132 are running different versions of the project's software code. The staging server 140 then pushes the new code changes in the staging build 142 to the master production build 132 to synchronize the two builds. Upon synchronization, the development zone 144 that submitted the changes may be ended and the subject developer and other developers may then request new development zones 144 to begin new phases of their work. In addition, other existing development zones 144 may then begin the process of committing their changes, since the master production build 132 is fully updated and the staging build 142 stands ready to accept new code submissions.

The system 100 for independent development zones 144 permits multiple software development zones 144 to operate concurrently and independently and work on the same portions of code simultaneously. By accepting changes from only one development zone 144 at a time and not creating new development zones 144 until the received set of code changes are fully tested and committed, the system 100 holds the production environment static to eliminate confusion that could result from changes being tested and committed from more than one development zone 144. The master production build 132 is not changed until the changes have been tested and determined to be functionally acceptable on the staging build 142. When the master production build 132 receives finalized changes and is hence synchronized with the staging build 142, the master production build 132 is then unlocked. Since the staging build 142 is synchronized with the production build 132, the staging build 142 is substantially identical with production. The staging build 132 may then be drawn upon for fully updated and current virtual copies for the creation of new development zones 144, and currently existing development zones 144 may seek to commit their code changes. The staging build 142 may be located in the same hardware as the virtual copies, so the copies may be created almost instantly.

Other components that may be present in the system 100 include an independent development zones server 110, which may include an independent development zones application 120, which may in turn include a virtual server management component 122, a change management component 124, a file system comparison component 126, and a staging server testing component 128; a production server 130 in which the master production build 132 may reside and which may communicate with a database 134; and one or more client devices 150, each of which may include a development interface 152.

Embodiments of the present disclosure provide enhancements to the system 100 described above. More specifically, the present disclosure provides for pre-emptive notifications of potential conflicts in different versions of code, for rolling snapshots of code taken at regular intervals, and for an instant rollback to a pre-commit production environment. Each of these features will be considered in turn herein. The features may be used independently of one another or in various combinations with one another.

Different developers may work with different versions of a software development file in different software development zones. That is, a first developer may copy a master file into a first development zone, and a second developer may copy the master file into a second development zone. The developers may then edit their respective copies of the master file independently of one another, thus creating a first version of the file in the first development zone and a second version of the file in the second development zone. U.S. Pat. No. 8,245,192 addressed techniques for resolving the conflicts that may occur when the different versions of the file are saved back to a master location. However, it may be desirable to prevent such conflicts from arising. Embodiments of the present disclosure provide techniques for pre-emptively avoiding such conflicts through the use of a monitoring and logging system.

Figure 2:
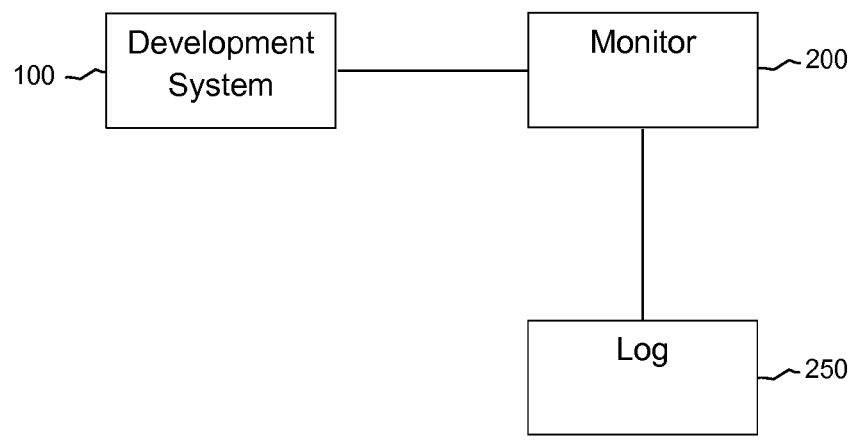
FIG. 2 is a block diagram of another system according to an embodiment of the disclosure.

FIG. 2 is a block diagram illustrating an enhancement of the development system 100 of FIG. 1 that includes a monitor component 200 and a log component 250. While the monitor component 200 and the log component 250 are shown outside the development system 100, it should be understood that the monitor component 200 and the log component 250 may be components within the development system 100. Also, while the monitor component 200 and the log component 250 are shown as independent components, it should be understood that the monitor component 200 and the log component 250 may be a single component and that actions described herein as being taken by one of the monitor component 200 and the log component 250 may be taken by either of the components or a combination of the components.

The monitor component 200 scans the files in the software development system 100 to determine if a modification has been made to any of the files, for example to the read-write virtual copies 146 in the development zones 144. The monitor component 200 may operate at regular intervals to determine if a change to a file has been made. The intervals may be, for example, five minutes, fifteen minutes, one hour, or some other time interval suitable to balance processing and currency. When a modification is detected, the monitor component 200 places a record of the modified file in the log component 250. The log of modified files may be copied into each development zone so that a comparison can be made in each zone to determine if a file that is being opened for editing in a first zone has been modified in a second zone.

When a developer opens a file for editing, the monitor component 200 compares the identity of the file being opened with the records of modified files in the log component 250. When a match is detected, indicating that the file being opened has been modified in another development zone, the monitor component 200 provides a notification to the developer attempting to open the file, informing the developer that a different version of the file has been modified in another development zone. In an embodiment, the method a developer uses to open a file for editing is altered so that the method is associated with the procedure for reading the records of modified files. That is, the command a developer typically uses to open a file may be replaced by a command that causes the log component 250 to be checked for modified files before the file to be opened for editing is actually opened. If there is no match between the file being opened for editing and a record of a file in the log component 250, then the file editor loads in its usual manner and the file to be edited is opened. If there is a match between the file being opened for editing and a record of a file in the log component 250, then the notification described above occurs. The monitor component 200 is also capable of keeping track of the developer associated with each development zone. Thus, the notification may inform the developer attempting to open the file of the identity of the developer who modified the different version of the file.

In other words, when a first developer attempts to edit a file, the monitor component 200 checks to see if the file has been edited by a second developer working independently in another zone. If the monitor component 200 determines that the second developer has edited the file, the monitor component 200 notifies the first developer of that fact and informs the first developer of the identity of the second developer. The first developer may then contact the second developer, and the two developers may work together to coordinate the changes that each developer wishes to make. Alternatively or additionally, the notification may instruct the first developer to edit the second developer's version of the file instead of editing the version that the first developer is attempting to open. Such pre-emptive conflict resolution may eliminate the need for resolving conflicts at the time different versions of the file are being saved, which may in turn expedite development and avoid errors.

Since the monitor component 200 accesses the file systems in each zone, it may be preferable for the monitor component 200 to be integrated with the other two components of the development zone system: the creation process and the commit process. All three of these components share the same locking mechanism. Therefore, it may be possible for only one component to run at a time. Because of this locking mechanism, it may be preferable for the monitor process to run efficiently. For example, if the monitor process runs every five minutes, it may be preferable for the process to last only about 20 seconds, for instance. If the monitor process were to take two and a half minutes to run, for example, then the creation and commit processes would only be available to the developers half the time, since the developers would be locked out for the other two and a half minutes of the scanning cycle. In an embodiment, the monitor process may be multi-threaded (one thread per zone) so that the process runs more efficiently.

When there is a match between a file being opened for editing and a file in the log component 250, a warning is displayed on the computer terminal or display screen of the developer opening the file. The warning may include the name of the other developer who previously modified a different version of the file. The following is an example of such a warning.

root@dev177#> vim PagedTable.pm
File: /web/###/lib/###/PagedTable.pm:
  This file has been modified on ###_###:dev170.
  Check with the user dana who created that zone to avoid a CONFLICT.
  Do you want to edit this file anyway? [y/n]

In an embodiment, the change detection procedure described above may also detect schema changes to a database in development compared to production. This capability may allow a developer to build new tables and add fields during development, and may allow the developer to receive a warning, if necessary, when the changes are committed. The code the developer has developed against is likely to need such changes, so the warning may allow the developer to update the schema in production as well. The schema change detection may occur automatically or, for safety reasons, may be performed manually.

A second feature disclosed herein provides for constant rolling snapshots with easy access for a developer. In each development zone, a snapshot, or a replica of the master production build, is taken at regular intervals, such as every five minutes or every 15 minutes. The snapshots are then made accessible in the developer's zone as a file system for easy access. The following shows the main file system area the developer works in. The file size and timestamp of the file can be noted.

root@dev177#> cd /web/###/lib/###/
root@dev177#> ls -al PagedTable.pm
-rwx------- 1 apache root 90813 Jul 14 16:23 PagedTable.pm To access a snapshot area, the developer simply changes the directory the developer is working in. This makes the older copies easily accessible to the developer from the same prompt. The names of the snapshots are maintained in relative time for the convenience of the developer. For example:

root@dev177#> ls /web/.###/snapshot/
last5 min/
5minsago/
10minsago/
15minsago/
20minsago/
25minsago/
30minsago/
lasthour/
1hourago/
2hoursago/
3hoursago/
4hoursago/
5hoursago/
6hoursago/
yesterday/
2daysago/
3daysago/
4daysago/
5daysago/
6daysago/

The snapshot named last5 min' was taken within the last five minutes and the snapshot named '5minsago' was taken at least five minutes ago, but no more than ten minutes ago. The lasthour snapshot was taken at the top of the last hour and the 'yesterday' snapshot was taken last midnight.

So if the developer wished to retrieve a version of a file that existed before a change was made between five and ten minutes ago, the developer could go to the '10minsago' snapshot in the file above and check the file from there. The following is an example of information related to a '10minsago' file.

root@dev177#> cd/web/.###/snapshot/10minsago/###/lib/###/
root@dev177#> ls -al PagedTable.pm
-rwx------- 1 apache root 90812 Jun 1 10:22 PagedTable.pm This example shows that, prior to the most recent edit, no changes were made since June 1st. The developer can then roll back the change with a simple copy command:

root@dev177#> cp PagedTable.pm /web/###/lib/###/

Or the developer could compare the changes with another standard command:

root@dev177#> diff PagedTable.pm/web/###/lib/###/PagedTable.pm

The snapshot area contains the actual files, but the files are read-only. All of the snapshots can be easily viewed at once to see all the changes available. The example below shows that the most recent change is the only one that has been made to that file since this development zone was created.

root@dev177#> cd/web/.###/snapshot/
root@dev177#> ls -al */###/lib/###/PagedTable.pm
-rwx------- 1 apache root 90812 Jun 1 10:22 10minsago/###/lib/###/PagedTable.pm
-rwx------- 1 apache root 90812 Jun 1 10:22 15minsago/###/lib/###/PagedTable.pm
-rwx------- 1 apache root 90812 Jun 1 10:22 1hourago/###/lib/###/PagedTable.pm
-rwx------- 1 apache root 90812 Jun 1 10:22 20minsago/###/lib/###/PagedTable.pm
-rwx------- 1 apache root 90812 Jun 1 10:22 25minsago/###/lib/###/PagedTable.pm
-rwx------- 1 apache root 90812 Jun 1 10:22 2daysago/###/lib/###/PagedTable.pm
-rwx------- 1 apache root 90812 Jun 1 10:22 2hoursago/###/lib/###/PagedTable.pm
-rwx------- 1 apache root 90812 Jun 1 10:22 30minsago/###/lib/###/PagedTable.pm
-rwx------- 1 apache root 90812 Jun 1 10:22 3daysago/###/lib/###/PagedTable.pm
-rwx------- 1 apache root 90812 Jun 1 10:22 3hoursago/###/lib/###/PagedTable.pm
-rwx------- 1 apache root 90812 Jun 1 10:22 4daysago/###/lib/###/PagedTable.pm
-rwx------- 1 apache root 90812 Jun 1 10:22 4hoursago/###/lib/###/PagedTable.pm
-rwx------- 1 apache root 90812 Jun 1 10:22 5daysago/###/lib/###/PagedTable.pm
-rwx------- 1 apache root 90812 Jun 1 10:22 5hoursago/###/lib/###/PagedTable.pm
-rwx------- 1 apache root 90812 Jun 1 10:22 5minsago/###/lib/###/PagedTable.pm
-rwx------- 1 apache root 90812 Jun 1 10:22 6daysago/###/lib/###/PagedTable.pm
-rwx------- 1 apache root 90812 Jun 1 10:22 6hoursago/###/lib/###/PagedTable.pm
-rwx------- 1 apache root 90813 Jul 14 16:23 last5 min/###/lib/###/PagedTable.pm
-rwx------- 1 apache root 90812 Jun 1 10:22 lasthour/###/lib/###/PagedTable.pm
-rwx------- 1 apache root 90812 Jun 1 10:22 yesterday/###/lib/###/PagedTable.pm In the example above, snapshots are taken every five minutes, every hour, and every day. The snapshots themselves may be a function of the file system, but the deployment within the developer zones, the renaming, and the automatic occurrence are a unique combination provided by the embodiments disclosed herein.

The five minute snapshots are renamed each time a new one is taken. Every hour another set of snapshots is taken and the hourly ones are renamed. Every day another snapshot is taken and the daily ones are renamed. So this process may be invoked with three separate calls in a system such as 'cron'. For example:
Daily snapshots
0 0 * * * /home/applications/###/bin/rolling snapshots.pl -mode daily
Hourly snapshots
0 1,2,3,4,5,6,7,8,9,10,11,12 * * *
/home/applications/###/bin/rolling snapshots.pl -mode hourly
Five Minute snapshots
0,5,10,15,20,25,30,35,40,45,50,55 * * * *
/home/applications/###/bin/rolling snapshots.pl -mode fivemin A third feature disclosed herein allows the production environment to be rolled back to the state just prior to the last commit or just prior to any previous commits. Some development systems provide a rollback to the previous build, but the present embodiments recognize that file system changes could be made as a result of running application code or as a result of an out-of-process change. So rather than rolling back to the last build, the present embodiments roll back to the point in time just before the last commit. Since testing is typically done almost immediately after a commit of changes, if a problem is detected during testing, a rollback can be performed almost immediately after the problem is discovered. This instant rollback will ensure that the file system is as close as possible to where it was prior to the change commit.

In an embodiment, such a rollback is achieved by separating the application binaries that run in memory from the code changes that are called from disk, such as html pages, images, php files, or javascript files. By separating these two groups, the rollback does not entail a restart of the applications running in production. The next access by a client after a rollback will simply be served the previous code.

This embodiment may entail the need to roll back any development zones that were created after the point in time of the selected rollback period. In an embodiment, such a rollback of development zones is achieved by automatically identifying all of those zones, copying all changes in those zones to a temporary place, rolling back the development zones, and then reapplying the changes.

Below is an example of procedures that might be followed in carrying out these embodiments, including some procedures that may have been described in more detail in U.S. Pat. No. 8,245,192.

Creation of the Development Zone

```
root@dragon#> devzone -z newfeature
Configuring zone settings for newfeature
Creating alternate filesystem
Shutting down ### (staging zone)
Stopping ###...
Shutting down database
.. SUCCESS!
Cloning ### for newfeature
Cloning snapshot zpool/zones/###@###zone93
Instead of copying, a clone has been created for this zone.
Booting ### back up
Customizing necessary files in newfeature
Booting newfeature
Waiting for newfeature to fully boot.....5s
Summary:
Zone: newfeature
IP Address: 10.191.45.179
URL: http://dev179.###.###.sprint.com
```

The developer can then log in to this zone and make changes and view them with the browser.

Committing Changes from Development Zone

When the developer is ready to commit he/she will run:

```
root@dragon#> commitchanges.pl -z newfeature
Checking zone: newfeature for CONFLICT files...
No CONFLICT files in this zone (this is good news).
Comparing current copy of newfeature with newfeature's baseline...
Comparison of files:
>f.st..... htdocs/###/tools.php
There is 1 difference.
Rsync Difference Codes:
   c = checksum, s = size, t = times, p = permissions,
   o = owner, g = group, u = user, +-+++++ = new file
The files listed should only include changes made in the zone newfeature.
If other changes are detected, you should stop now, make a new zone, and manually copy your changes into the new zone and delete newfeature.
Do you want to run a diff analysis on the changed files to see what the changes are (make sure your terminal is wide and you have a buffer)?
(y/n) y
~~~~ Diff of htdocs/###/tools.php is below~~~~~~~~~~~~~
*** ORIGINAL
--- NEW
***************
* 1,2 **
--- 1,4 ----
   <?php
+ /*update test*/
    $page_name = "Tools";
Press Enter to continue to next file.
Do you want to continue? (y/n) y
Backing up all your changes to a tarfile.
Comparing newfeature baseline with current files in ### (dev.###.###.sprint.com).
There are 0 differences.
No differences...(this is the best case), we can continue.
Do you want to continue? (y/n) y
Enter some text to describe your changes. (can be multiline)
Press Enter then Ctrl-D when Done
New feature added to the tools section. (Just testing)
^D
This will be Build 2321 committed by todd
Do you want to commit your changes? (y/n) y
Done writing to /zones/ChangeLog
.d..t..... htdocs/###/
>f.st..... htdocs/###/tools.php
Updating the baseline image for newfeature
.d..t..... htdocs/###/
>f.st..... htdocs/###/tools.php
You should now test your changes using
http://dev.###.###.sprint.com
Then (if successful) commit the changes to production:
/home/applications/###/bin/commitchanges.pl --production
```

Production Commit

After testing in the staging zone, the developer can commit to production:

```
Jul 14 16:54:34 EDT
root@dragon#>
/home/applications/###/bin/commitchanges.pl --production
!!!!!!!!!!!!!!!!!!!!!!!!!!!!!!!!!!!!!!!!!!!!!!!!!!!!!!!!!!!
Running in Production Mode, will sync dev.###.###.sprint.com
to Production servers!
!!!!!!!!!!!!!!!!!!!!!!!!!!!!!!!!!!!!!!!!!!!!!!!!!!!!!!!!!!!
For maximum effectiveness you should have your ### Agent running
```

```
or you will be prompted for a lot of passwords.
Do you want to continue? (y/n) y
Comparing staging server with production server...
Comparison of files:
<f.st..... htdocs/###/tools.php
There is 1 difference.
Rsync Difference Codes:
    c = checksum, s = size, t = times, p = permissions,
    o = owner, g = group, u = user, +++++++ = new file
Build 2321 committed to production by todd
Do you want to commit your changes? (y/n) y
Done writing to /###/ChangeLog
Creating snapshots on: ### and ###... **
Now syncing to: ###...
.d..t..... htdocs/###/
>f.st..... htdocs/###/tools.php
Now syncing to: ###...
.d..t..... htdocs/#·0#/
>f.st..... htdocs/###/tools.php
You should now verify your changes using https://###.###.sprint.com/
```

Rollback

A developer can request a rollback at any time. In an embodiment, one build will be rolled back. The lines in the above output with the ** indicate when the snapshot is taken. It can be seen this is just prior to the new files being copied to production. The production and staging servers will be rolled back to this state.

```
root@dragon#> commitchanges.pl --rollback
We will now rollback production then staging to BeforeBuild2321
Do you want to continue? (y/n) y
Rolling back production servers ###and ###
Comparison of files:
>f.st..... htdocs/###/tools.php
There is 1 difference.
Rsync Difference Codes:
    c = checksum, s = size, t = times, p = permissions,
    o = owner, g = group, u = user, +++++++ = new file
Production servers have been rolled back.
Rolling back staging zone ###
Staging zone '###' has been rolled back successfully.
Updating timestamp on:
/###/###/###/web/htdocs/###/tools.php
Done writing to /###/ChangeLog
Rollback Completed
```

All files changed have their timestamp updated so they will be newer than any file in another other development zone. This ensures they are compared on a future commit of those zones.

A rollback to a specific build is also allowed. For example: commitchanges.pl --rollback BeforeBuild2319

Details of each build are stored automatically in the change log for the developer to check when a problem is introduced. The details automatically include all of the files that are changed as well as a description from the developer.

Figure 3:
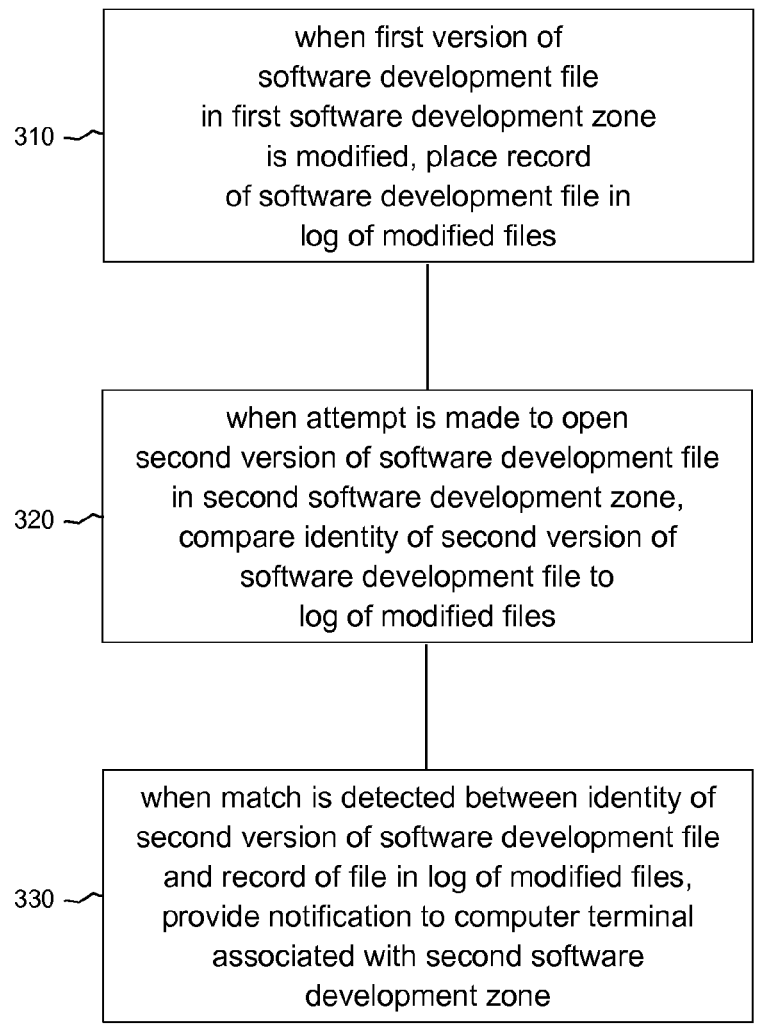
FIG. 3 is a flow chart illustrating a method for managing software according to an embodiment of the disclosure.

FIG. 3 is a flow chart illustrating a method for notification of a change in a software development file. At block 310, when a first version of a software development file in a first software development zone is modified, a record of the software development file is placed in a log of modified files. At block 320, when an attempt is made to open a second version of the software development file in a second software development zone, the identity of the second version of the software development file is compared to the log of modified files. At block 330, when a match is detected between the identity of the second version of the software development file and a record of a file in the log of modified files, a notification is provided to a computer terminal associated with the second software development zone. The notification indicates that a modification has been made to a version of the software development file other than the second version of the software development file and further indicates an identity of a software developer associated with the first software development zone.

Figure 4:
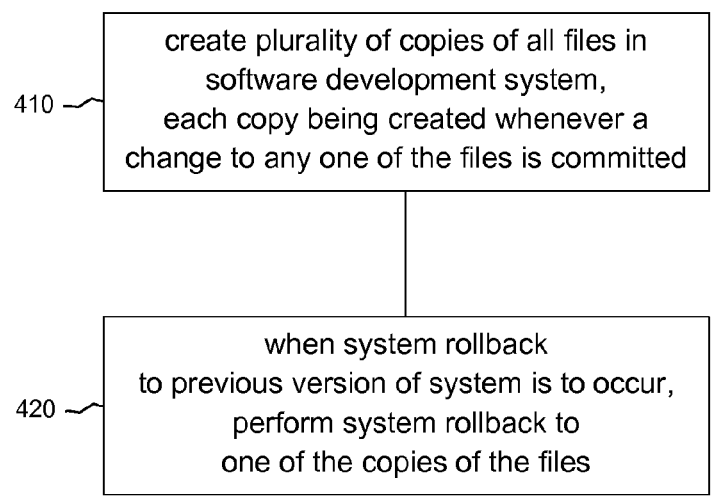
FIG. 4 is a flow chart illustrating a method for rolling a software development system back to a previous version of the system according to an embodiment of the disclosure.

FIG. 4 is a flow chart illustrating a method for rolling a software development system back to a previous version of the system. At block 410, a plurality of copies of all files in the software development system is created. Each of the plurality of copies is created whenever a change to any one of the files is committed. At block 420, when a system rollback to a previous version of the system is to occur, the system rollback is performed to one of the copies of the files.

Figure 5:
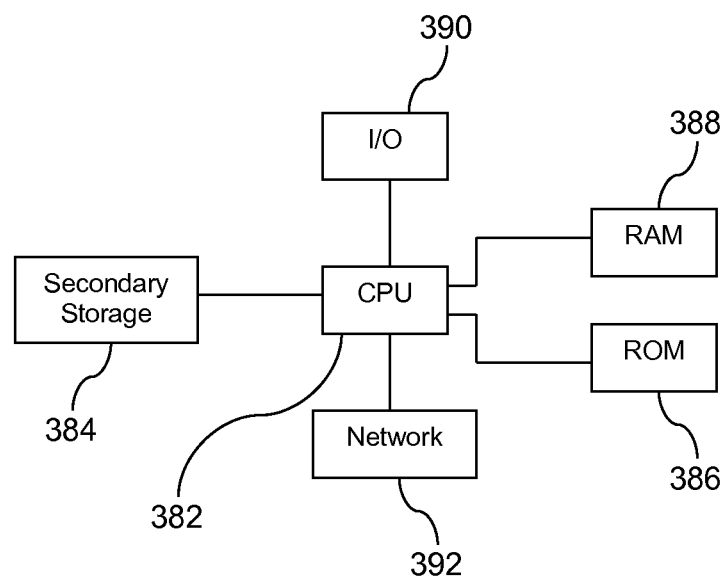
FIG. 5 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing software comprising:
    periodically scanning, by a computer system that comprises a non-transitory memory and a processor, a plurality of read-write clones of a master production build in a plurality of software development zones in a software development system to determine whether a modification has been made to at least one of the plurality of read-write clones, wherein the plurality of software development zones comprise a first development zone and a second development zone, and wherein each of the plurality of software development zones comprises a recording of state-based references to files and folders of the master production build in a read-only snapshot of the master production build and a read-write clone of the master production build;
    in response to the periodic scanning and a first read-write clone of the master production build in the first software development zone being modified, placing, by the computer system, a record of the first read-write clone in a log of modified files;
    responsive to an attempt to open a second read-write clone of the master production build in the second software development zone, comparing, by the computer system, an identity of the second read-write clone to the log of modified files;
    responsive to the comparing yielding a match that is detected between the identity of the second read-write clone and a record of a file in the log of modified files, providing, by the computer system, a notification to a software developer associated with the second software development zone via a computer terminal associated with the second software development zone prior to receiving a modification to the second read-write clone in the second software development zone, wherein the notification: indicates that a modification has been made to another read-write clone of the master production build, instructs the software developer associated with the second software development zone to edit the first read-write clone instead of editing the second read-write clone based on the match, and further indicates an identity of a software developer associated with the first software development zone; and
    in response to the notification, receiving, by the computer system from the computer terminal associated with the second software development zone, a modification to the first read-write clone instead of edits to the second read-write clone.

2. The method of claim 1, wherein a replica of the master production build is created at regular intervals and made accessible as a file system.

3. The method of claim 1, further comprising:
    creating a plurality of copies of all files in the software development system, each of the plurality of copies being created whenever a change to any one of the files is committed; and
    when a system rollback to a previous version of the system is to occur, rolling back the software development system to an earlier state based on one of the plurality of copies of files.

4. The method of claim 3, wherein the system rollback is achieved by separating application binaries that run in memory from code changes that are called from disk.

5. The method of claim 3, wherein the system rollback includes a development rollback of development zones that were created after the time of the system rollback, and wherein the development rollback comprises identifying the development zones that were created after the time of the system rollback, copying all changes in the development zones that were created after the time of the system rollback to a temporary location, rolling back the development zones that were created after the time of the system rollback, and reapplying the changes to the development zones that were created after the time of the system rollback.

6. The method of claim 1, wherein the method is implemented in an independent development zones application stored in a non-transitory memory that, when executed by a processor:
    creates a development zone of the plurality of development zones in response to a request received in a first message,
    receives a second message containing a request to commit changes to the master production build, the changes comprising updating the master production build with changes made to the read-write clone of the master production build,
    compares the read-only snapshot of the master production build with the current master production build to determine changes committed to the master production build subsequent to the creation of the development zone,
    compares changes made to the read-write clone of the master production build and changes committed to the master production build subsequent to the creation of the development zone,
    identifies individual files and folders both changed in the read-write clone of the master production build and changed and committed to the master production build subsequent to the creation of the read-write clone of the master production build, and
    commits the changes made to the read-write clone of the master production build to a staging build and the master production build.

7. A system for managing software comprising:
    a non-transitory memory;
    a processor;
    a log component stored in the non-transitory memory that configures the processor upon execution by the processor; and a monitor component stored in the non-transitory memory that configures the processor upon execution by the processor, the execution of the monitor component occurring such that:
- the monitor component periodically scans a plurality of read-write clones of a master production build in a plurality of software development zones in a software development system to determine whether a modification has been made to at least one of the plurality of read-write clones, wherein the plurality of software development zones comprise a first development zone and a second development zone, and wherein each of the plurality of software development zones comprises a recording of state-based references to files and folders of the master production build in a read-only snapshot of the master production build and a read-write clone of the master production build,
- in response to the periodic scanning and a first read-write clone of the master production build in the first software development zone being modified, the monitor component places a record of the first read-write clone in the log component,
- responsive to an attempt to open a second read-write clone of the master production build in the second software development zone, the monitor component compares an identity of the second read-write clone to records in the log component, and
- responsive to the comparing yielding a match that is detected between the identity of the second read-write clone and a record in the log component, the monitor component provides a notification to a software developer associated with the second software development zone via a computer terminal associated with the second software development zone prior to receiving a modification to the second read-write clone in the second software development zone, wherein the notification: indicates that a modification has been made to another read-write clone of the master production build, instructs the software developer associated with the second software development zone to edit the first read-write clone instead of editing the second read-write clone based on the match, and further indicates an identity of a software developer associated with the first software development zone, and wherein in response to the notification, the system receives a modification to the first read-write clone from the computer terminal associated with the second software development zone instead of edits to the second read-write clone.

8. The system of claim 7, wherein a replica of the master production build is created at regular intervals and made accessible as a file system.

9. The system of claim 7, wherein a plurality of copies of all files in the software development system is created, each of the plurality of copies being created whenever a change to any one of the files is committed, and wherein, when a system rollback to a previous version of the system is to occur, the system rollback is performed to one of the copies of the files.

10. The system of claim 9, wherein the system rollback is achieved by separating application binaries that run in memory from code changes that are called from disk.

11. The system of claim 9, wherein the system rollback includes a development rollback of development zones that were created after the time of the system rollback, wherein the development rollback comprises identifying the development zones that were created after the time of the system rollback, copying all changes in the development zones that were created after the time of the system rollback to a temporary location, rolling back the development zones that were created after the time of the system rollback, and reapplying the changes to the development zones that were created after the time of the system rollback.

12. The system of claim 7, further comprising an independent development zones application stored in a non-transitory memory that, when executed by a processor:
- creates a development zone of the plurality of development zones in response to a request received in a first message,
- receives a second message containing a request to commit changes to the master production build, the changes comprising updating the master production build with changes made to the read-write clone of the master production build,
- compares the read-only snapshot of the master production build with the current master production build to determine changes committed to the master production build subsequent to the creation of the development zone,
- compares changes made to the read-write clone of the master production build and changes committed to the master production build subsequent to the creation of the development zone,
- identifies individual files and folders both changed in the read-write clone of the master production build and changed and committed to the master production build subsequent to the creation of the read-write clone of the master production build, and
- commits the changes made to the read-write clone of the master production build to a staging build and the master production build.

13. A method for rolling a software development system back to a previous version of the system, the method comprising:
- creating, by a computer system that comprises a non-transitory memory and a processor, a plurality of copies of all files in the software development system, each of the plurality of copies being created whenever a change to any one of the files is committed;
- responsive to a first version of a software development file in a first software development zone being modified, placing, by the computer system a record of the software development file in a log of modified files, wherein the record is one of the plurality of copies;
- responsive to an attempt being made to open a second version of the software development file in a second software development zone, comparing, by the computer system, an identity of the second version of the software development file to the log of modified files;
- responsive to the comparing yielding a match that is detected between the identity of the second version of the software development file and record of a file in the log of modified files, providing, by the computer system, a notification to a computer terminal associated with the second software development zone prior to receiving a modification to the second read-write clone in the second software development zone, wherein the notification: indicates that a modification has been made to a version of the software development file other than the second version of the software development file, instructs the software developer associated with the second software development zone to edit the first read-write clone instead of editing the second read-write clone based on the match, and further indicates an identity of a software developer associated with the first software development zone;

in response to the notification, receiving, by the computer system from the computer terminal associated with the second software development zone, a modification to the first read-write clone instead of edits to the second read-write clone; and when a system rollback to a previous version of the system is to occur, rolling back, by the computer system, the software development system to an earlier state based on one of the plurality of copies of files that was created responsive to a change to any one of the files being committed, wherein the software development system comprises a plurality of computer instruction files and configuration files.

14. The method of claim 13, wherein the system rollback is achieved by separating application binaries that run in memory from code changes that are called from disk.

15. The method of claim 13, wherein the system rollback includes a development rollback of development zones that were created after the time of the system rollback, wherein the development rollback comprises identifying the development zones that were created after the time of the system rollback, copying all changes in the development zones that were created after the time of the system rollback to a temporary location, rolling back the development zones that were created after the time of the system rollback, and reapplying the changes to the development zones that were created after the time of the system rollback.

16. The method of claim 13, further comprising periodically scanning the software development files in a software development system to determine if a modification has been made to at least one of the files and, when a modification is detected, placing a record of the modified file in the log of modified files.

17. The method of claim 13, wherein the method is implemented in an independent development zones application stored in a non-transitory memory that, when executed by a processor:

creates a development zone in response to a request received in a first message, the development zone comprising a recording of state-based references to files and folders of a master production build in a read-only snapshot of the master production build and a read-write clone of the master production build, receives a second message containing a request to commit changes to the master production build, the changes comprising updating the master production build with changes made to the read-write clone of the master production build, compares the read-only snapshot of the master production build with the current master production build to determine changes committed to the master production build subsequent to the creation of the development zone, compares changes made to the read-write clone of the master production build and changes committed to the master production build subsequent to the creation of the development zone, identifies individual files and folders both changed in the read-write clone of the master production build and changed and committed to the master production build subsequent to the creation of the read-write clone of the master production build, and commits the changes made to the read-write clone of the master production build to a staging build and the master production build.

* * * * *